Patented Oct. 3, 1933

1,928,647

UNITED STATES PATENT OFFICE 1,928,647

MANUFACTURE OF SULPHONATED CONDENSATION PRODUCTS OF AROMATIC COMPOUNDS

George Holland Ellis, Henry Charles Olpin, and Ernest William Kirk, Spondon, near Derby, England, assignors to Celanese Corporation of America, a corporation of Delaware No Drawing. Application September 4, 1929, Serial No. 390,423, and in Great Britain September 8, 1928

14 Claims. (Cl. 260—54)

This invention relates to the manufacture of new condensation products particularly applicable as dispersing agents, more especially for the production of finely divided suspensions or dispersions of insoluble or difficultly soluble dyestuffs, and to the preparation of such dispersions and to the dyeing, printing, stencilling, or otherwise colouring therewith of materials made of or containing cellulose esters or cellulose ethers.

According to this invention new water-soluble sulphonated compounds, particularly suitable as dispersing agents for insoluble or difficultly soluble compounds, are obtained by the condensation of furfural or derivatives thereof with aromatic compounds, whether carbocyclic or heterocyclic, and by then sulphonating the products if they do not already contain sulphonic groups or if they contain a proportion of sulphonic groups insufficient to give them the desired solubility.

The condensation may be effected in various ways depending on the nature of the parent materials; for instance it may be carried out in the presence of substances of acid or alkaline nature, for example an acid such as sulphuric acid or an alkali such as sodium carbonate. When an aromatic sulphonic acid is to be used the preparation thereof may often conveniently be combined with the condensation with the furfural or the like. Thus an aromatic compound may be sulphonated with sulphuric acid of suitable strength and then condensed with furfural in the same solution, if necessary after suitable adjustment of the strength and temperature of the acid; or the sulphonation of the aromatic compound may be effected simultaneously with the condensation, for example a mixture of an aromatic compound and furfural may be heated with concentrated sulphuric acid or other sulphonating agent.

For the sulphonation or further sulphonation of the products, when necessary, there may be employed any suitable sulphonating agent such as concentrated or fuming sulphuric acid or chlorosulphonic acid.

Among the aromatic compounds which may be used according to the invention may be mentioned aromatic hydrocarbons or heterocyclic aromatic compounds, especially di- or poly-cyclic compounds for example naphthalene, anthracene or carbazole, or crude products containing such hydrocarbons or heterocyclic compounds, aromatic hydroxy compounds or crude products containing them, halogenated aromatic compounds, or the sulphonic acids of any of them, but the invention is not restricted thereto.

As derivatives of furfural which may be employed may be mentioned methyl furfural and furfuramide.

The new products in the form of the free acids or their alkali or ammonium salts are readily soluble in water yielding solutions of a colloidal nature and have been found to be valuable dispersing and wetting agents.

The new condensation products, as indicated above, are also applicable as wetting agents. They may, for example, be added to any liquids to facilitate the wetting of textile and other materials or substances therewith, or be mixed with dry powdered substances or the like to facilitate wetting, solution, dispersion, or the like on treatment with liquids.

The new condensation products have the advantage of very good solubility and very good stability in the presence of acids or of calcium or other salts present in hard water. In the solid state they form white to grey powders, and as previously indicated, dissolve in water yielding solutions of a colloidal nature.

The following examples illustrate the invention but are not to be regarded as in any way limiting it:—

Example 1

500 parts of napthalene are mixed with 500 parts of sulphuric acid 95%, and heated slowly to 160° C. and kept at this temperature for 10 hours. The mixture is cooled to 50° C. and 150 parts of water added so that the temperature does not rise above 85° C. At this temperature 150 parts of furfural are added, and the mixture immediately heated to 100° C. and kept at this temperature for 4 to 6 hours. The batch is then cooled, and diluted with 300 parts of water, and partly neutralized with 200 parts of 40% caustic soda solution. The furfural-naphthalene sulphonic acid then separates on standing, and is filtered, washed and dried.

Example 2

500 parts of benzene are sulphonated with 1100 parts of sulphuric acid in the usual manner, and the sulphonation mixture is cooled to 50–60° C. and 75 parts of furfural dropped in slowly. The temperature is then raised to 100° for 2 hours, and the whole poured on to 3,000 parts of crushed ice, partly neutralized with 1,000 parts of 30% caustic soda solution, 500 parts of salt added and the mixture allowed to cool. The furfural benzene-sulphonic acid then separates and is filtered off, washed and dried.

Example 3

500 parts of phenol are sulphonated with 1,400 parts of sulphuric acid at 110° C. until it is quite soluble in cold water. After cooling to 70-80° C. 50 parts of furfural are dropped in, and the whole stirred at 100° C. for 2 hours. The mixture is then run to 3,000 parts of ice, partly neutralized with 1,000 parts of 30% caustic soda solution, 500 parts of salt added and the separated furfural phenol sulphonate filtered off, washed and dried.

What we claim and desire to secure by Letters Patent is:—

1. Method of preparing water-soluble sulphonated condensation products which comprises reacting an aromatic compound containing at least one aromatic nucleus capable of sulphonation with a sulphonating agent and in the presence of a condensing agent selected from the group consisting of mineral acids and inorganic substances of alkaline reaction with the carbonyl radicle of a compound selected from the group consisting of the furane aldehydes and their amides.

2. Method of preparing water-soluble sulphonated condensation products which comprises reacting an aromatic compound containing at least one aromatic nucleus capable of sulphonation with a sulphonating agent and then reacting in the same solution the product thus formed with the carbonyl radicle of a compound selected from the group consisting of the furane aldehydes and their amides.

3. Method of preparing water-soluble sulphonated condensation products which comprises reacting a compound containing at least one sulphonated aromatic nucleus in the presence of a condensing agent selected from the group consisting of mineral acids and inorganic substances of alkaline reaction with the carbonyl radical of a compound selected from the group consisting of furane aldehydes and their amides.

4. Method of preparing water-soluble sulphonated condensation products comprising condensing a compound selected from the group consisting of furane aldehydes and their amides with a compound containing at least one aromatic nucleus capable of sulphonation in the presence of sulphuric acid.

5. Method of preparing water-soluble sulphonated condensation products comprising condensing a compound selected from the group consisting of furane aldehydes and their amides with a compound having at least one sulphonated aromatic nucleus in the presence of sulphuric acid.

6. Method of preparing water-soluble sulphonated condensation products comprising sulphonating a compound containing at least one aromatic nucleus capable of sulphonation and condensing with a compound selected from the group consisting of furane aldehydes and their amides in the sulphonation mixture.

7. Method of preparing water-soluble sulphonated condensation products comprising condensing a compound selected from the group consisting of furane aldehydes and their amides with naphthalene in the presence of sulphuric acid.

8. Method of preparing water-soluble sulphonated condensation products comprising condensing a compound selected from the group consisting of furane aldehydes and their amides with sulphonated naphthalene in the presence of sulphuric acid.

9. Method of preparing water-soluble sulphonated condensation products comprising sulphonating naphthalene and condensing with a compound selected from the group consisting of furane aldehydes and their amides in the sulphonation mixture.

10. Method of preparing water-soluble sulphonated condensation products which comprises reacting a compound containing at least one aromatic nucleus capable of sulphonation in the presence of a condensing agent selected from the group consisting of mineral acids and inorganic substances of alkaline reaction with the carbonyl radicle of a compound selected from the group consisting of the furane aldehydes and their amides, and converting the reaction product into a water-soluble salt by sulphonation.

11. As new products the water-soluble sulphonated condensation products formed by the reaction of compounds containing at least one aromatic nucleus capable of sulphonation with a sulphonating agent and with the carbonyl radicle of compounds selected from the group consisting of furane aldehydes and their amides.

12. As new products the water-soluble sulphonated condensation products of naphthalene with compounds selected from the group consisting of furane aldehydes and their amides.

13. As new products the water-soluble condensation products of sulphonated napthalene with compounds selected from the group consisting of furane aldehydes and their amides.

14. As new products water-soluble salts of sulphonated condensation products formed by converting into a water-soluble salt the product of the reaction of compounds containing at least one aromatic nucleus capable of sulphonation with a sulphonating agent and with the carbonyl radicle of compounds selected from the group consisting of furane aldehydes and their amides.

GEORGE HOLLAND ELLIS.
HENRY CHARLES OLPIN.
ERNEST WILLIAM KIRK.